H. REININGER.
BARREL WASHING MACHINE.
APPLICATION FILED JUNE 20, 1918.

1,347,402.

Patented July 20, 1920.
8 SHEETS—SHEET 1.

WITNESSES
Fredrick Diehl.
A. L. Kitchin.

INVENTOR
Henry Reininger
BY
ATTORNEYS

H. REININGER.
BARREL WASHING MACHINE.
APPLICATION FILED JUNE 20, 1918.

1,347,402. Patented July 20, 1920.
8 SHEETS—SHEET 2.

WITNESSES
Frederick Diehl.
A. L. Kitchin.

INVENTOR
Henry Reininger
BY
ATTORNEYS

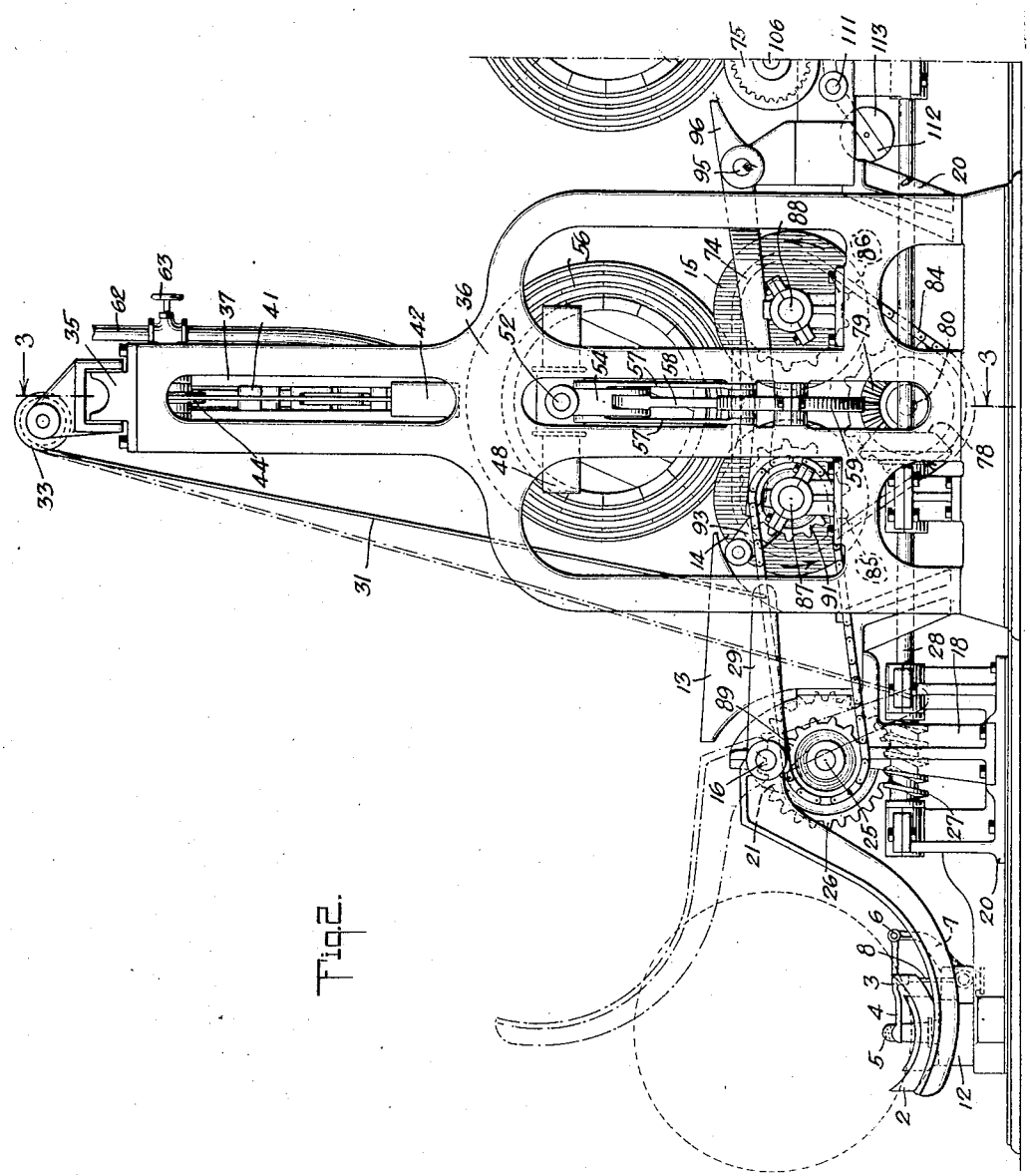

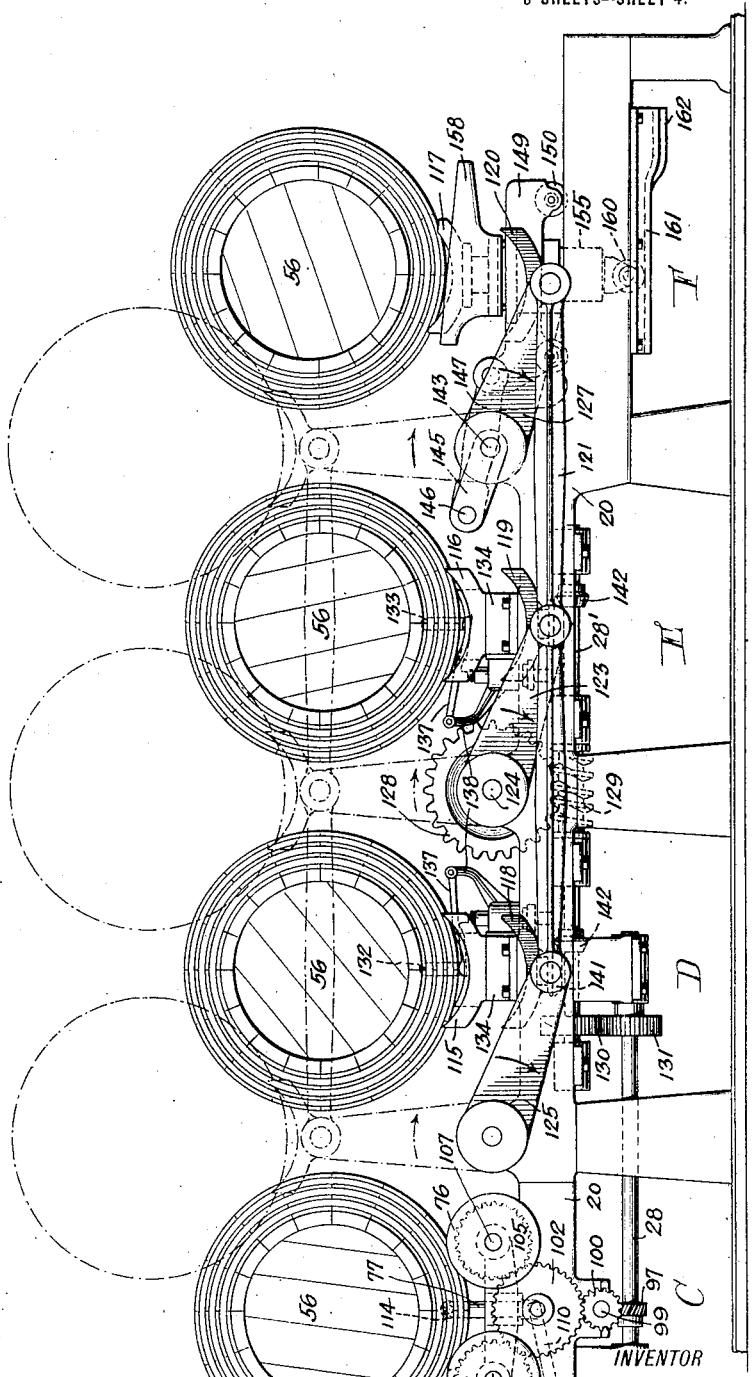

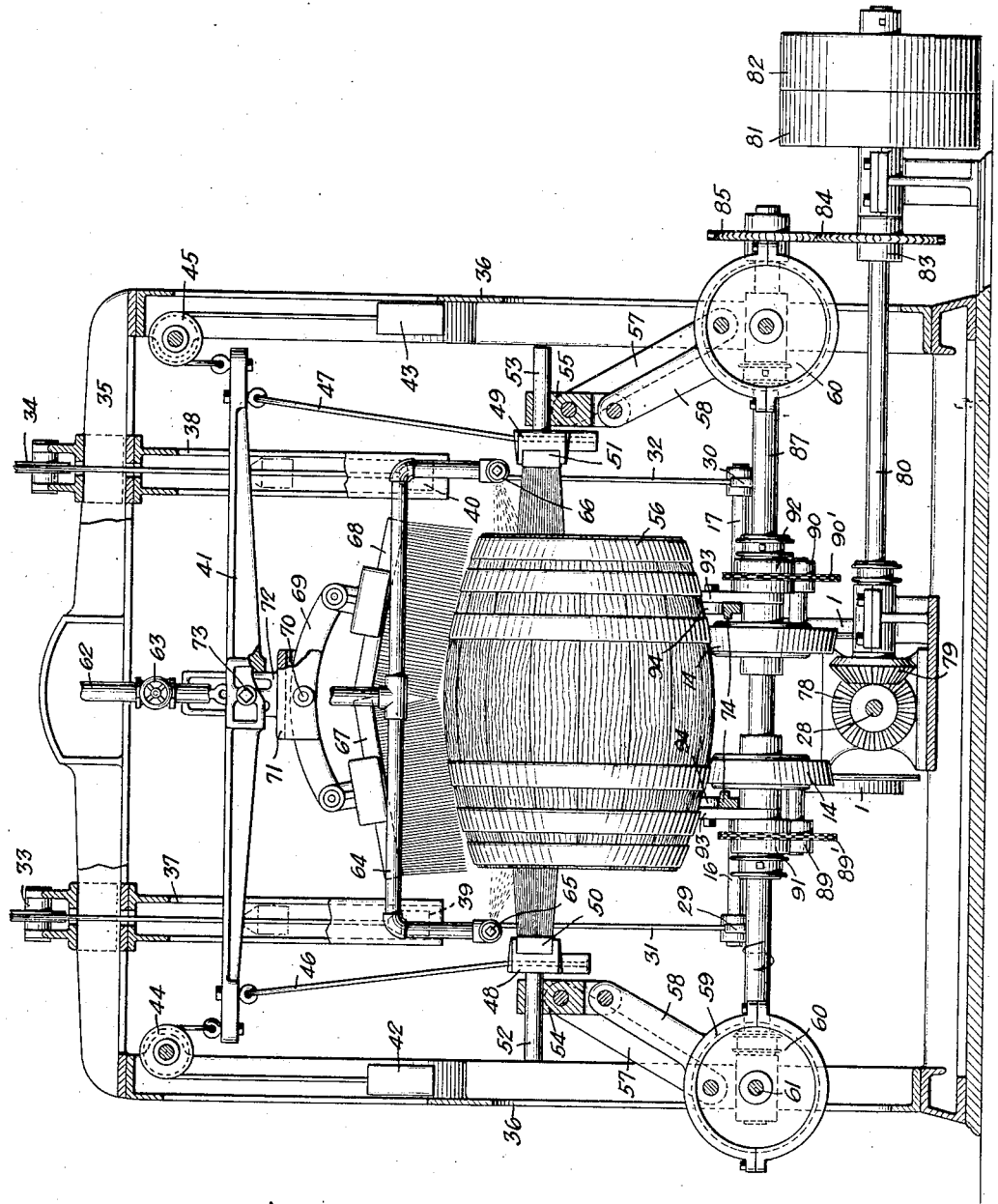

H. REININGER.
BARREL WASHING MACHINE.
APPLICATION FILED JUNE 20, 1918.
1,347,402.
Patented July 20, 1920.
8 SHEETS—SHEET 6.
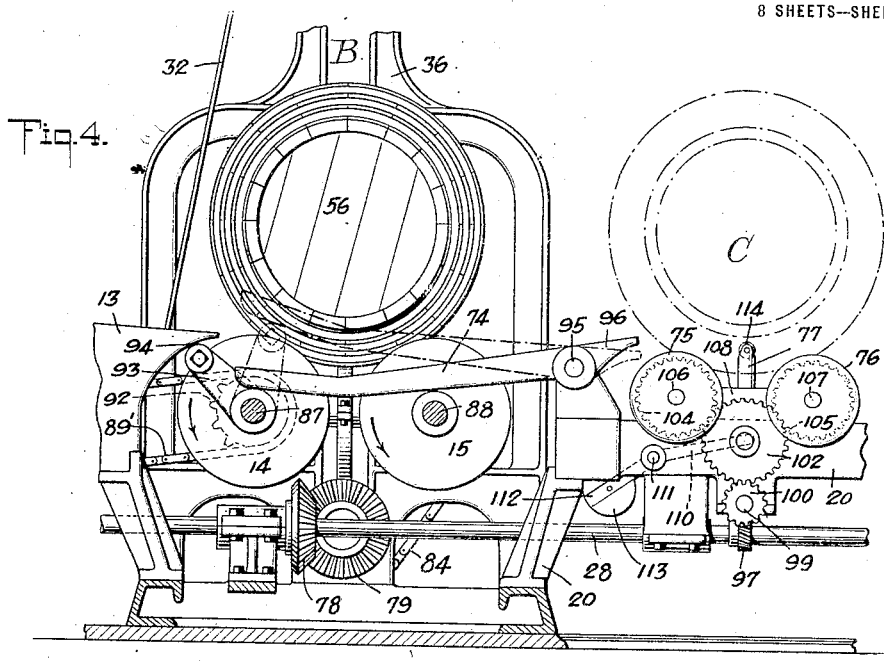
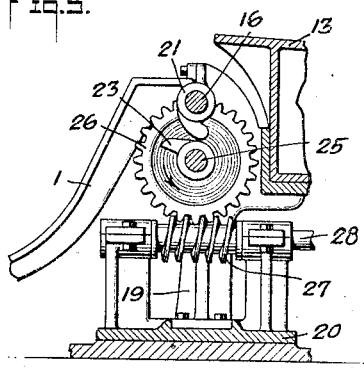
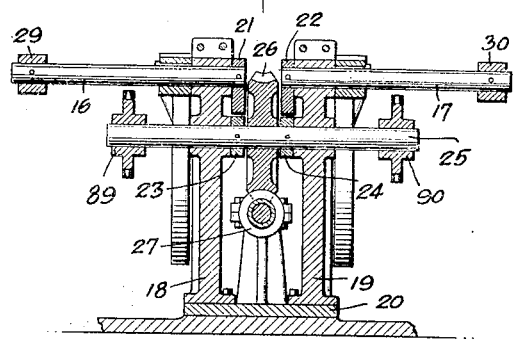
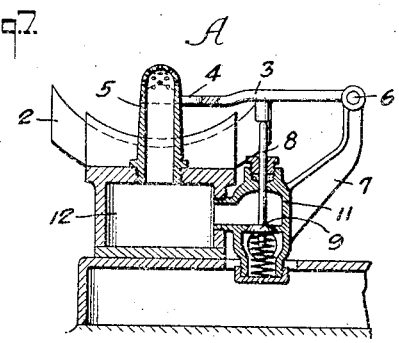
WITNESSES
Frederick Diehl.
A. L. Kitchin
INVENTOR
Henry Reininger.
BY
ATTORNEYS H. REININGER.
BARREL WASHING MACHINE.
APPLICATION FILED JUNE 20, 1918.
1,347,402.
Patented July 20, 1920.
8 SHEETS—SHEET 7.
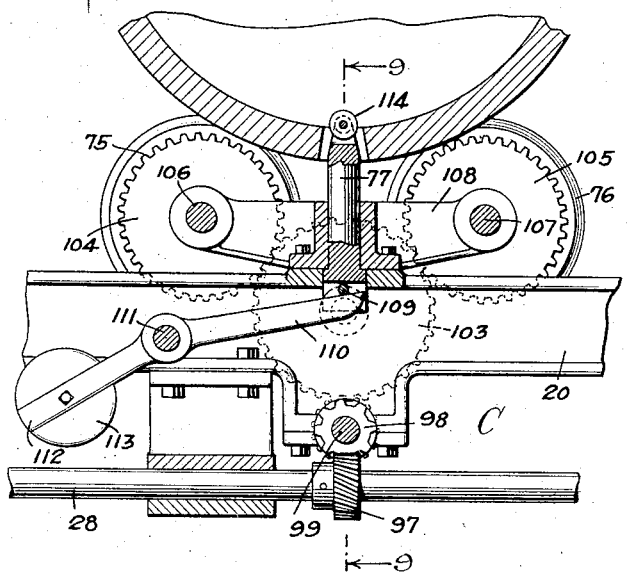
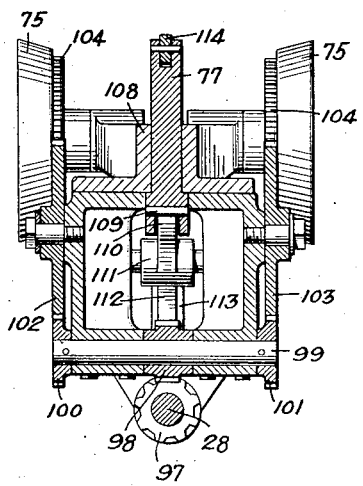
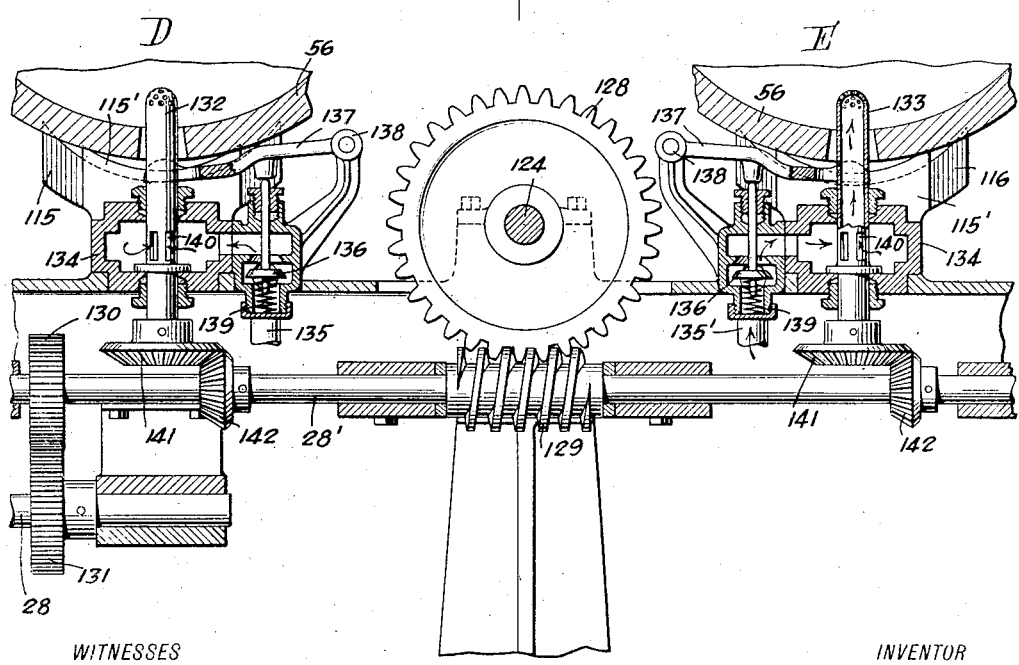
WITNESSES
Frederick Diehl.
A. L. Kitchin.
INVENTOR
Henry Reininger
BY
ATTORNEYS

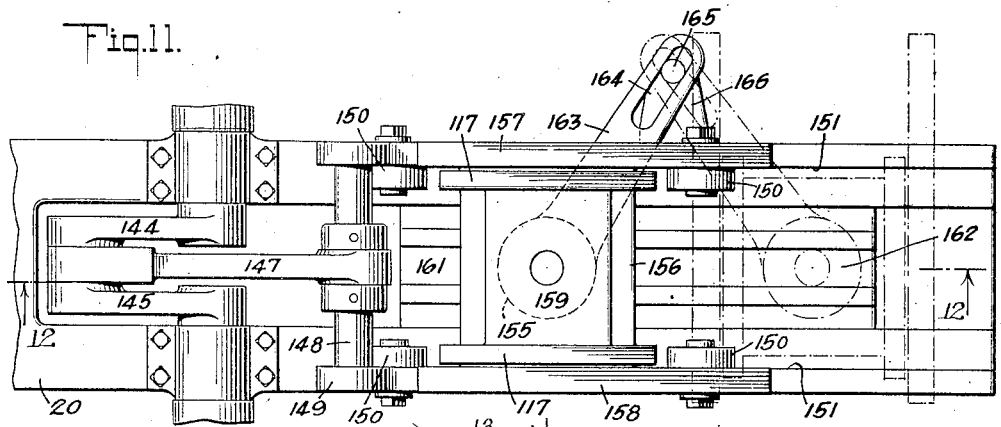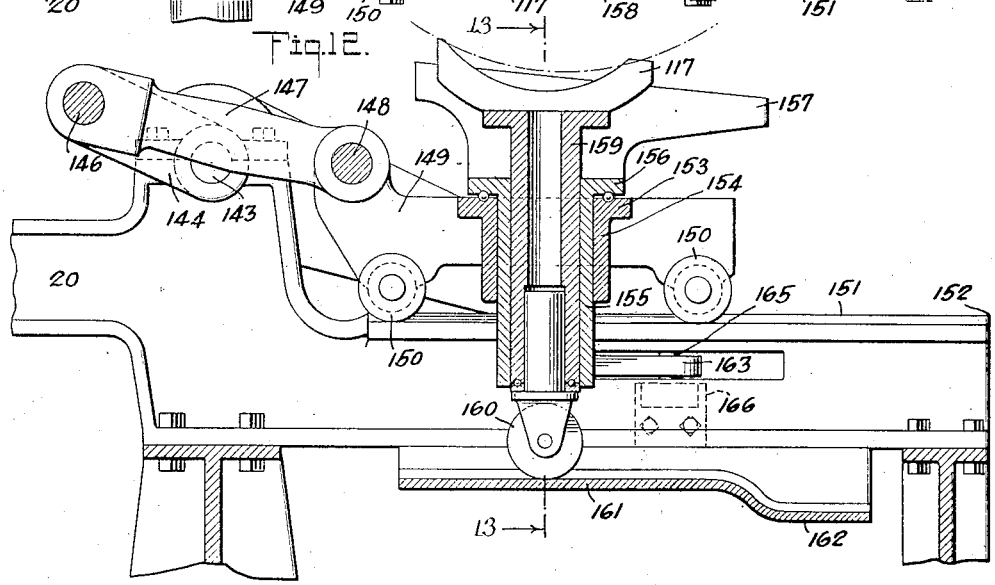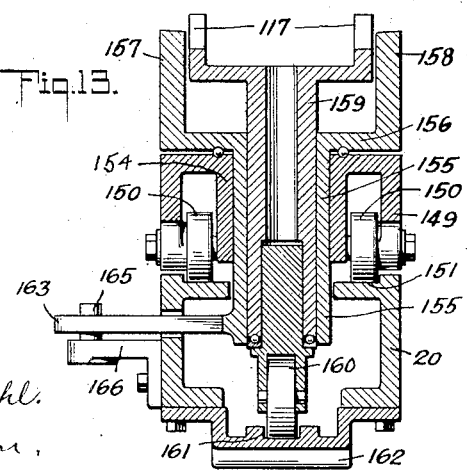

UNITED STATES PATENT OFFICE.

HENRY REININGER, OF NEW ORLEANS, LOUISIANA.

BARREL-WASHING MACHINE.

1,347,402.  Specification of Letters Patent.  Patented July 20, 1920.

Application filed June 20, 1918. Serial No. 240,965.

*To all whom it may concern:*

Be it known that I, HENRY REININGER, a citizen of the United States, and a resident of New Orleans, in the parish of Orleans and State of Louisiana, have invented a new and Improved Barrel-Washing Machine, of which the following is a full, clear, and exact description.

This invention relates to a washing apparatus for barrels and has for an object the provision of an improved construction and arrangement whereby the interior and exterior surface of a barrel, package or the like may be substantially simultaneously cleaned.

Another object in view is to provide a washing machine for barrels wherein the interior of the barrel will be soaked and washed while the exterior will be soaked and scrubbed with brushes, the soaking, washing and scrubbing being carried on automatically through a number of successive steps.

A still further object in view is the provision of a single structure in which a number of different steps are provided for cleaning the interior and exterior of barrels or other packages with different parts coacting to successively clean certain parts and remove the cleaning water so that the barrel or other package may be fed in at one end and discharged at the opposite end clean without manipulation or guidance by an operator.

In the accompanying drawings:

Figure 1 is a top plan view of approximately half of a washing machine disclosing an embodiment of the invention.

Fig. 1ᴬ is a top plan view of the other half of the washing machine shown in Fig. 1.

Fig. 2 is a side view of the construction shown in Fig. 1.

Fig. 2ᴬ is a side view of the construction shown in Fig. 1ᴬ.

Fig. 3 is a sectional view through Fig. 2 on line 3—3.

Fig. 4 is a fragmentary sectional view through Fig. 1 on line 4—4.

Fig. 5 is a fragmentary sectional view through Fig. 1 on line 5—5.

Fig. 6 is a transverse sectional view through Fig. 1 on line 6—6.

Fig. 7 is a fragmentary sectional view through Fig. 1 on line 7—7.

Fig. 8 is a detail fragmentary sectional view through Fig. 1ᴬ approximately on line 8—8.

Fig. 9 is a sectional view on an enlarged scale through Fig. 8 on line 9—9.

Fig. 10 is a fragmentary sectional view through Fig. 1ᴬ approximately on line 10—10.

Fig. 11 is a top plan view on an enlarged scale of the discharge mechanism at one end of the structure shown in Fig. 1ᴬ.

Fig. 12 is a sectional view through Fig. 11 on line 12—12.

Fig. 13 is a sectional view through Fig. 12 on line 13—13.

In producing a machine embodying the invention it is aimed to utilize unskilled labor and yet secure desirable results, namely a substantially perfect cleaning exteriorly and interiorly of a barrel or package of any kind. To accomplish this result the machine has been made to act successively on the barrel when in different conditions of cleaning and to finally discharge the barrel cleaned inside and outside.

Figure 1:
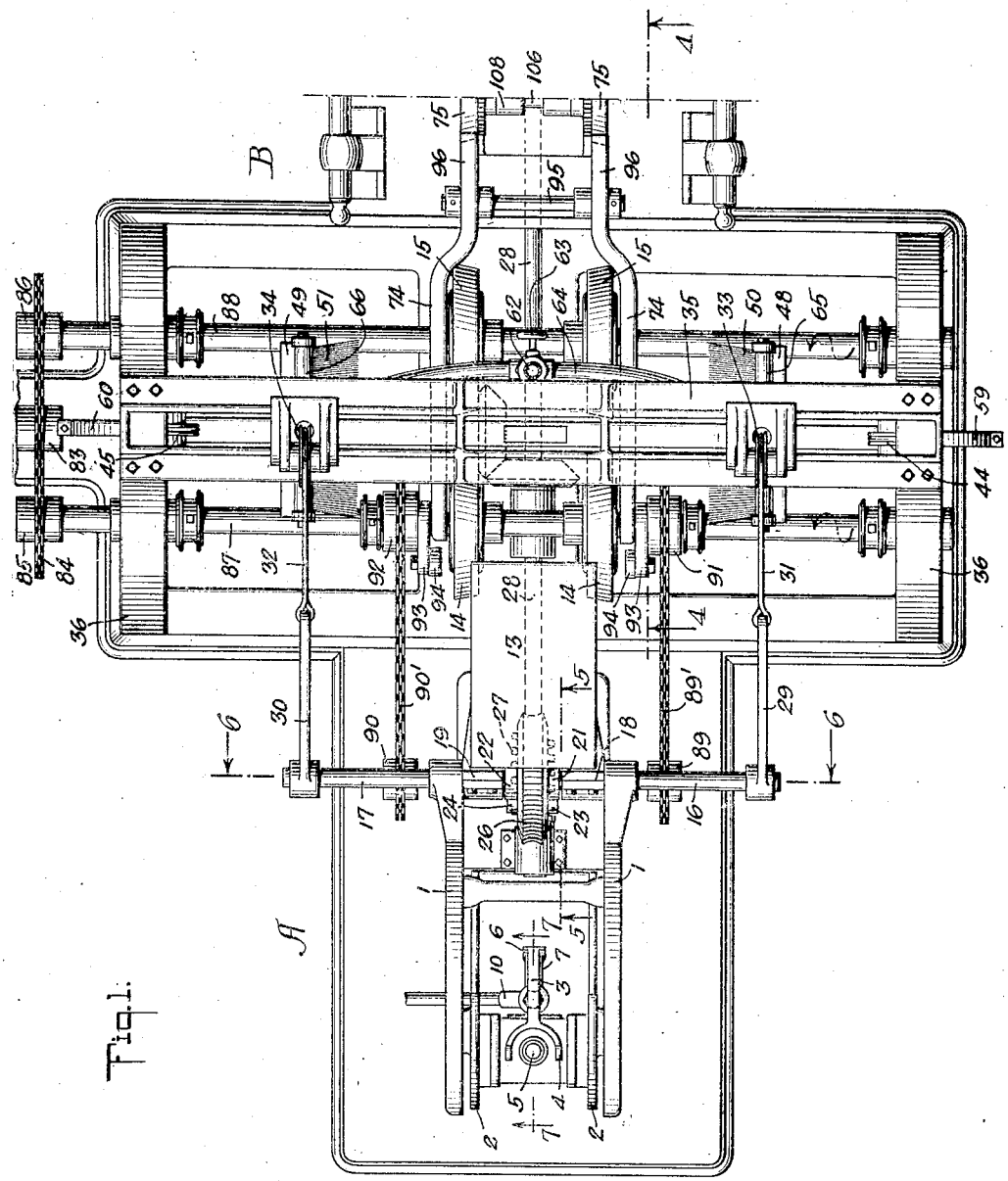

As shown in Fig. 1 of the drawing the barrel is started at station A where it is placed on the arms 1 by the operator, who may be an unskilled laborer, and as the machine operates the barrel will be passed successively through stations B, C, D, E and F. As soon as the machine moves the barrel from station A to station B the operator places another barrel at station A and continues to place new barrels at station A as the old ones are moved along. When a barrel has been placed on station A it receives water interiorly for a short time and is then moved to station B where it is rotated so that the water in the barrel will wash and thereby clean the interior. In addition the washing and scrubbing apparatus hereinafter fully described will act on the exterior of the barrel. From station B the barrel is automatically moved to the arresting station C where it is rotated until the bung hole is in its lowermost position and so held until the interior washing water is allowed to drain. At the proper time means engage the barrel at station C and moves the same to station D where hot water is supplied interiorly. After the proper spraying of the hot water is accomplished the barrel is moved from station D to station E where it receives a rinsing of cold water. As the barrel is moved from station D to station E the hot water therein is allowed to drain so that the rinsing will merely clean the hot water and any remaining foreign matter from the barrel. If desired the hot water may have a detergent mixed therewith, as for instance lime, which is naturally washed out by the clear water at station E. From station E the barrel is moved to station F and upon the proper operation of station F the barrel is discharged laterally from the machine. It will thus be seen that the barrel when once manually placed in position receives a cleaning and soaking solution at station A, receives an outside cleaning at station B and then receives additional cleaning and rinsing waters before finally discharged at the end opposite the point where it is supplied to the machine.

When the barrel is placed on the saddles 2 at station A it first engages the lever 3 which has a bifurcated end 4 partially surrounding the nozzle 5. As the weight of the barrel rests on the lever 3 it is moved downwardly on its pivot 6, which is supported by suitable brackets 7. As the lever moves downwardly it presses against the pin 8 and this pin is connected to valve 9. Said valve is opened so that water or other cleaning fluid from the pipe 10 will pass through the valve opening at 9 and through the valve casing 11 into the chamber 12 and from thence through the nozzle 5 into the barrel, the nozzle 5 projecting through the bunghole in the barrel. When the barrel is first placed in position the arms 1 are positioned a short distance below the saddles 2, but as the machine operates the arms 1 will gradually move pivotally until they assume the dotted position shown in Fig. 2 whereupon the barrel will roll automatically under the action of gravity on to the skid 13 and from thence on to the two sets of rollers 14 and 15. These rollers are cone-shaped and are spaced a sufficient distance apart to receive barrels of different sizes and to rotate the barrels as hereinafter fully described. The arms 1 are keyed or otherwise rigidly secured to the shafts 16 and 17 which shafts are journaled in suitable journal boxes carried by brackets 18 and 19 connected with the general supporting frame 20. In addition to having arms 1 secured to these shafts the hook shaped cams 21 and 22 (Figs. 5 and 6) are rigidly secured to these shafts and coact with the cams 23 and 24 rigidly secured to the shaft 25. Shaft 25 is supported by brackets 18 and 19 and has rigidly secured thereto a driving worm wheel 26 which continually meshes with the worm 27 carried by the shaft 28, which shaft is supported by suitable bearing boxes carried by frame 20. It will thus be seen that whenever the shaft 28 rotates the worm gear 26 in the direction as shown by the arrow in Fig. 5 the various cams will engage and the arms 1 will be elevated as heretofore described. The arms are held elevated until the cams 23 and 24 pass the cams 21 and 22 whereupon the arms 1 will drop back to their former position under the action of gravity. Near the outer ends of the shafts 16 and 17 are provided arms 29 and 30, said arms being rigidly secured to shafts 16 and 17 so as to move therewith. These arms have flexible cables 31 and 32 connected therewith as shown in Figs. 1 and 2, said cables passing over suitable pulleys 33 and 34 mounted on the cross bar 35 of the auxiliary frame 36. These cables pass down through suitable apertures in the cross bar 35 as shown in Fig. 3 and into guiding members 37 and 38 in which are arranged weights 39 and 40 to which the ends of these cables are rigidly secured. These cables pass loosely through the beam 41 whereby when the weighted ends of the cables are moved upwardly by the downward movement of the arms 29 and 30 the weights 39 and 40 will engage the beam 41 near the opposite ends and elevate the same. The cables 31 and 32 and parts connected therewith are counter-balanced by the weights 42 and 43, said weights being connected to suitable cables passing through pulleys 44 and 45 and then secured to the beam 41 in any suitable manner. Cables 46 and 47 are connected to the beam 41 and also to the castings 48 and 49 respectively which support the brushes 50 and 51, said brushes having handles 52 and 53 which are held continuously in a horizontal position by the blocks 54 and 55 whereby the ends of the bristles engage the ends of the barrel 56. As the beam 41 is moved upwardly cables 46 and 47 will pull on the castings 48 and 49 so as to elevate the brushes 50 and 51 and in the act of elevating cause the brushes to move away from the barrel 56 as movement is conveyed to the blocks 54 and 55. These blocks are held in position by the respective links 57 and 58 which have a parallel motion, the links 58 being connected to the ring 59 which is rotatably mounted upon the disk 60, which disk in turn is rigidly supported by the fixed shaft 61. The respective links 57 are pivotally mounted at one end of the respective disk 60, there being as shown in Fig. 3, a disk 60 on each side of the machine. This construction and parallel motion of the links 57 and 58 are merely to hold the brushes in such a position as to cause the ends of the bristles to engage the ends of the barrel 56 and thereby produce a better scrubbing action as the barrel is rotated by the pairs of wheels 14 and 15.

As the barrel 56 is rotated the water or other liquid therein will soak and wash the interior of the barrel while the exterior is provided with water or other washing solution from the general supply pipe 62. A valve 63 is arranged in pipe 62 for controlling the flow of liquid therefrom. The pipe 62 is provided with a transverse pipe 64 which is preferably provided with apertures so that water may be discharged downwardly on to the surface of the barrel 56 while the end sections 65 and 66 connected with pipe 64 discharge a spray on each end of the barrel. As the barrel rotates the ends are scrubbed by the brushes and water applied thereto while the periphery is scrubbed by brushes 67 and 68 and the water applied thereto. These brushes are pivotally mounted on rocking bar 69 so as to conform to the shape of the barrel and to engage all parts of the periphery. The bar 69 is pivotally mounted at 70 in a substantially U-shaped fitting 71 having a lug 72 extending through an aperture in beam 41 and is clamped in position by any suitable means, as for instance clamping screw 73. This allows a vertical adjustment of the brushes 67 and 68 and associate parts in order to properly act upon barrels of different sizes. The water is supplied to pipes 62 from any suitable source in the same manner that water is supplied to pipe 10 at station A. It will be observed that station A is arranged to supply water interiorly to the barrel and then cause the barrel to be moved to station B where the barrel is rotated for washing the inside and is scrubbed on the outside. After the scrubbing operation has been carried on for a predetermined length of time the barrel is discharged from station B on to resting station C. This is accomplished by the arms 74 moving upwardly to the dotted position shown in Fig. 4 whereupon the barrel 56 will be moved out of contact with the pairs of rollers 14 and 15 and allowed to move under the action of gravity toward station C until it rests upon the two pairs of cone rollers 75 and 76. These rollers are rotated and consequently rotate the barrel until it has been properly centered and the plunger 77 has moved upwardly into the bung-hole whereupon rotation is stopped and the barrel is allowed to drain. This plunger moves out of the way as hereinafter fully described when the barrel is first placed in position and automatically moves up into the bung-hole when brought in register therewith.

In order to operate the various moving parts, as for instance the arms 1 and the pairs of rollers 14 and 15 a driving shaft 28 is provided which is shown operatively connected to the arms 1 through the use of the aforementioned worm gear, cams and the like for operating said arms. This shaft extends to station D where it is supported by a suitable depending bracket and drives the various parts through various connecting mechanism hereinafter fully described. As shown in Fig. 3 shaft 28 receives power through a beveled gear 78 meshing with beveled gear 79 driven by power shaft 80, which power shaft has pulleys 81 and 82 connected thereto, one of said pulleys being a loose pulley while the other is a fixed pulley. Any suitable power may be used to rotate the fixed pulley and thereby transmit motion to the moving parts of the machine. Shaft 80 has rigidly secured thereto a sprocket 83 carrying a chain 84 which chain passes over sprockets 85 and 86 rigidly secured to the shafts 87 and 88 (Fig. 1). These shafts carry the pairs of rollers 14 and 15 to which they are rigidly secured. In this way the barrel is rotated continuously when thereon regardless of the position of the arms 1 and associate parts. As shown in Figs. 1 and 6 the shaft 25 carrying the worm wheel 26 also carries sprocket wheels 89 and 90 over which the chains 89' and 90' pass, said chains also passing over sprockets 91 and 92 loosely mounted on the shaft 87, each of said sprockets having rigidly secured thereto an arm 93 having an anti-friction roller 94, which engages each of the arms 74 and arranges the same for causing the discharge of the barrel 56 as shown in dotted lines in Fig. 4. As soon as the levers 93 are moved from beneath the levers 74 the last mentioned levers drop down by gravity out of the way of the next barrel. The arms 74 are pivotally mounted at 95 on suitable brackets carried by the frame 20, said arms being provided with extensions 96 so as to cause a proper discharge of the barrels on to the resting station C.

As shown in Figs. 2ᴀ, 4 and 8 shaft 28 is provided with a supporting bearing near station C so that the gear 97 may properly mesh with the pinion 98 which pinion is rigidly secured to the shaft 99 (Fig. 9) carried by a suitable bearing box. On the ends of the shaft 99 are arranged pinions 100 and 101 meshing with idlers 102 and 103, which idlers in turn mesh with the gear wheels 104 and 105 rigidly secured to the shafts 106 and 107, which shafts carry the respective pairs of cone rollers 75 and 76. By this construction and arrangement whenever shaft 28 is rotated motion will be transmitted to the rollers 75 and 76 for rotating the same in proper timed relationship to the movement of arms 1 and the other parts at station A and B. The bracket 108 carrying the shafts 106 and 107 is bolted or otherwise rigidly secured to frame 20 and is provided with an aperture through which the plunger 77 is slidingly fitted, said plunger having an enlarged lower end striking against the bottom of fitting 108 which acts as overhanging shoulders therefor. The bottom of the plunger 77 is also bifurcated and is supplied with a pin 109 which acts as a bearing for arm 110. Arm 110 is pivotally mounted at 111 and is provided with an extension 112 carrying a weight 113 whereby the arm is given a continuous tendency to move upwardly and force the plunger 77 upwardly, said arm extending into the bifurcation at the lower end of the plunger as shown in Fig. 9, whereby it is properly held in place and a comparatively small bearing surface is provided so as to cause a proper movement of the plunger. A small roller 114 is mounted on top of the plunger 77 so as to produce an easier action when the barrel is first placed on the rollers 75 and 76. It will thus be seen that when the barrel is first placed in position unless the bung-hole is registering with the plunger said plunger will be depressed against the action of arm 110 until the barrel has been turned sufficiently for causing a registration, whereupon the plunger will move upwardly into the bung-hole and prevent a further rotation of the barrel though the rollers 75 and 76 continue to rotate. As the plunger 77 is somewhat smaller than the bung-hole the barrel will be allowed to drain while being held stationary at station C so that it will be completely deprived of the interior wash water or substantially deprived of said wash water before it is moved to the next station, namely station D, where it receives a new supply of washing water, preferably hot.

At stations D, E and F a number of stationary saddles 115, 116 and 117 are provided, the last mentioned saddle being movable under some circumstances while the others are bolted or otherwise secured to the frame 20. Associated with the saddles just mentioned are movable or shifting saddles 118, 119 and 120 carried by suitable shafts rigidly secured to the connecting bars 121 and 122. Said connecting bars are shifted by the two power arms 123 operated by shaft 124. A pair of idler arms 125 are journaled at one end of the stub shafts carrying the saddles 118 and the opposite ends are rigidly secured to the rotatable shaft 126 mounted in suitable bearings on the frame 20. A combined idler and power set of arms 127 are provided for station F so as to assist arms 125 in holding the bars 121 and 122 parallel and in a horizontal plane as they are moved by the arms 123. In this manner the various movable or shifting saddles are held in an upright position so that when the barrels are shifted from one station to the other, as shown in dotted lines in Fig. 2ᴬ said barrels will remain in proper position and be properly placed on the respective stationary saddle. As shown in Figs. 1ᴬ and 10 the shaft 124 is mounted in suitable bearings and has rigidly secured thereto a worm gear 128 meshing with the worm 129 carried by the auxiliary guiding shaft 28′. This shaft receives power through the gear 130 meshing with gear 131 rigidly secured to the power shaft 28. During the operation of the machine the shaft 124 is continuously rotated so that the parts connected therewith are continuously moving so that the various saddles 118 to 120 will be moved beneath the barrels positioned at stations C, D and E and then operated to raise said barrels as shown in Fig. 2ᴬ and shift the same to stations D, E and F. The parts are so formed that three barrels are shifted at one time, one to the discharge mechanism at station F and the other two to additional cleaning mechanisms at stations D and E. These additional cleaning mechanisms at stations D and E are shown more in detail in Fig. 10 wherein it will be seen that it is important that the barrel as it leaves station C is not turned as it is necessary it should be placed on the stationary saddles 115 so that the bung-hole will move over the nozzle 132 while the barrel from station D must be moved so that the bung-hole will fit over the nozzle 133 at station E.

Figure 1A:
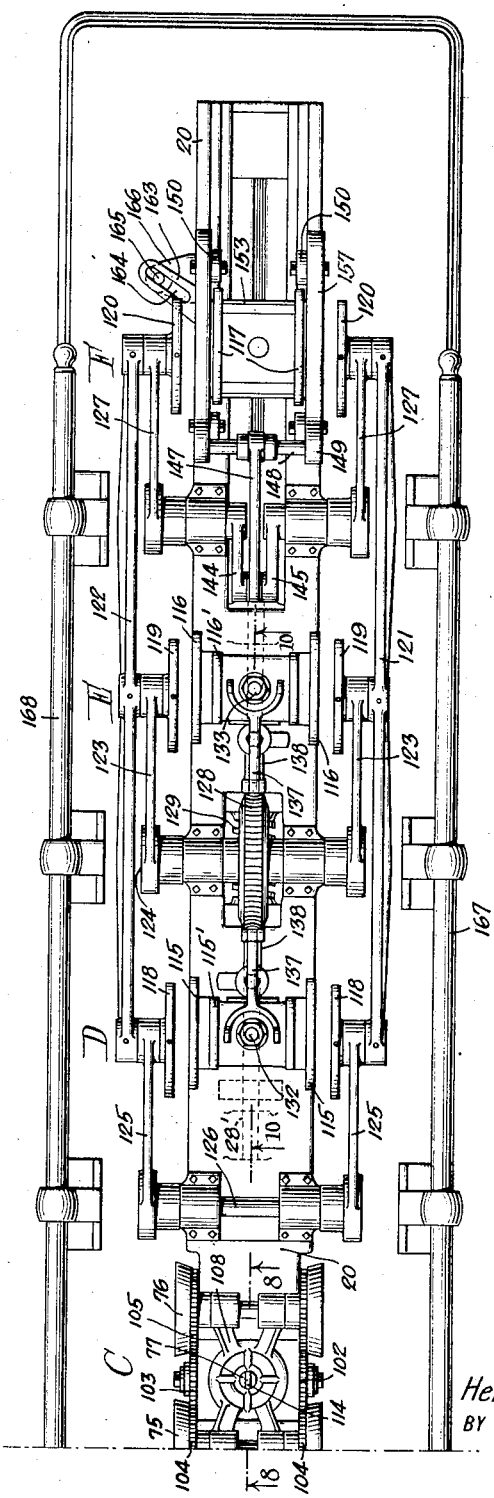

It will be noted that stations D and E are provided with extra auxiliary saddles 115′ and 116′ in case extra small barrels are being cleaned. Nozzle 132 is provided with a number of apertures in the upper end for spraying the cleaning liquid which is preferably hot water. As this spraying continues it strikes the interior of the barrel with some considerable force and cleans and washes the barrel by impact and flowing thereover, as the barrel in this instance is not rotated, but the wash water is allowed to pass freely out the bung-hole. The nozzle 132 is rotatably mounted so as to extend through the casing 134 which casing is supplied with water from any suitable source through pipe 135. A valve 136 is provided for regulating the flow of water through pipe 135 and for shutting the same off when barrel 56 has been moved from saddle 115. Valve 136 is operated by lever 137 pivotally mounted at 138 and swung on its pivot by the barrel as it is placed on the saddle 115. A spring 139 acts to close valve 136 and raise the lever 137 when the barrel has been moved from the saddle. The water passing into the casing 134 will pass through apertures 140 into the nozzle and be distributed in the barrel. This distribution is given a whirling movement by the fact that the nozzle carries a bevel gear 141 meshing with bevel gear 142 secured to shaft 28′. After the barrel 56 has remained at station D for the prescribed length of time saddle 119 will engage the same and move it to the stationary saddle 116. This saddle is associated with nozzle 133 and operating parts identical with those shown in respect to station D so that no additional description will be necessary and the same numerals will apply. However the pipe 135′ is preferably connected with a cold water supply so as to spray cold water instead of hot water as is used at station D. After the barrel has remained a proper length of time at station E the saddles 120 will engage the same and move the barrel over to the discharge station F shown in detail in Figs. 11, 12 and 13. As soon as the barrel has been placed upon the saddle 117 the parts begin to operate for causing a discharge thereof. In this instance the power is transmitted through the bars 121 and 122 to arms 127 and from thence to the stub shafts 143 mounted in suitable journal members on the frame 20. A pair of crank arms 144 and 145 are rigidly secured to the shafts 143 having connecting pins 146 extending therethrough at the outer end for accommodating the connecting link 147 which is journaled on the shaft 148 rigidly secured to the carriage 149. This carriage is provided with rollers or wheels 150 moved upon suitable tracks 151 so that as the parts are operated and the saddle 120 moved downwardly and then forwardly to proceed and engage another barrel the connecting rod 147 moves the carriage 149 oppositely toward the end 152 of frame 20. The carriage 149 carries a transverse structure 153 having a depending section 154 acting as a guiding tube for the sleeve 155 which sleeve has an upper plate 156 supported by suitable ball bearings on member 153. The upper plate 156 merges into side guides or skids 157 and 158 having their upper surfaces continually at a slant so that when the barrel is allowed to rest thereon it will automatically move by gravity thereover. From Fig. 13 it will be seen that the saddles 117 are connected to a tubular support 159 which carries a caster 160 at the lower end fitting into a track 161, which track has a depressed portion 162. When the carriage 149 is moved by the link 147 and associate parts it eventually moves to a position above the depressed track 162 whereupon the weight of the barrel and associate parts will cause the caster 160 and associate parts including the saddle 117 to move downwardly and allow the barrel to rest on the skids 157 and 158 whereupon the barrels will under the action of gravity, roll off said skids. If desired the parts could be arranged so that the barrels could roll off in substantially axial alinement with frame 20, but preferably they are discharged at one side. In order to accomplish this result an arm 163 is rigidly secured to or formed integral with sleeve 155, said arm having a slot 164 at the outer end for accommodating the pin 165 carried by the stationary bracket 166. The slot 164 and arm 163 are sufficiently long to allow the arm 163 to move from substantially the position shown in full lines in Fig. 11 to a right angle position thereto, whereupon the saddles 117 and the skids 157 and 158 are turned at right angles to the frame 20 as shown in dotted lines in Fig. 11 so that the barrel will move laterally from the device. After the barrel has been discharged in this manner the parts are again moved back to the position shown in Fig. 1A ready to receive the next barrel by the time the saddle 120 is ready to deposit a barrel thereon.

In placing the machine in position for use it may, of course, be mounted on any desired foundation and may be connected with any kind of power. Preferably a pair of guard rails 167 and 168 are provided opposite the stations C, D, E and F.

What I claim is:

1. A barrel washing apparatus comprising a washing station, a receiving station, means at the receiving station for directing a washing liquid into a barrel at said receiving station, a pair of arms for raising said barrel, a skid for directing the barrel from the raised arms to the washing station, a cam connected with each of said arms, a pair of operating cams coacting with the first mentioned cams for moving said first mentioned cams and the arms connected therewith, a shaft connected to said operating cams, a worm gear rigidly connected with said shaft, a worm meshing with said worm gear, driving means for operating said worm, means for rotating the barrel on said washing station, means for scrubbing the exterior of the barrel as it is rotated, said means for rotating the barrel being connected with said driving means so as to operate in timed relationship therewith, and means for causing the barrel at the washing station to be moved therefrom under the action of gravity.

2. A barrel washing apparatus comprising a frame, a receiving station, means for directing water into the barrel positioned on the receiving station, a washing station, means for transferring a barrel from the receiving station to the washing station, a rotatable support forming part of the washing station for receiving said barrel and rotating the same as long as it remains at the washing station, a pair of arms movable a predetermined distance by said transfer means, a cable connected with each of said arms, a pulley arranged at the top part of said frame for each of the cables, a beam arranged adjacent the top part of said frame, counter-balancing pulleys connected with the beam for supporting the beam and associate parts, means for connecting the first mentioned cables to said beam for accommodating the beam when said arms are moved, a scrubbing mechanism connected with said beam whereby when the beam is elevated the scrubbing mechanism is moved away from the barrel and said barrel is moved to a resting station adjacent the washing station, transfer means for transferring the barrel from the washing station to the resting station, and means for directing a barrel from the resting station to the discharge point.

3. A barrel washing machine comprising a frame, a washing mechanism, a discharge mechanism, and means for moving the barrels from the washing mechanism to the discharged mechanism, said discharge mechanism comprising a supporting saddle, a skid arranged adjacent the saddle, a carriage for supporting said saddle, an inclined skid, means for moving said carriage to a discharge point, means for guiding the skid during the movement of the carriage so that it will move away from the barrel and cause the barrel to rest on the skid, and means for rotating the skid for a partial revolution during the movement of said carriage whereby the barrel is discharged at one side of said frame.

4. In a barrel washing apparatus, a frame, washing means, transfer means and a discharge mechanism arranged at one end of said frame, said discharge mechanism comprising a carriage, a horizontal track supporting said carriage, means for reciprocating said carriage on said track, an auxiliary track arranged below said first mentioned track with a depressed portion, a pair of inclined skids rotatably mounted on said carriage, a pair of saddles mounted on said carriage and extending through the support of the skids, said saddles being movable vertically independently of the skid, a caster supporting said saddles positioned on said auxiliary track whereby when said carriage is moved to a predetermined position the caster and saddles will move into said depressed portion of said auxiliary track and thereby lower said saddle and said track so that the barrel will rest on said skids and move by gravity therefrom, an operating arm connected with said skids for turning the skids for part of a revolution as said carriage moves so that the barrel moving off said skids will move to one side of said frame.

5. In a barrel washing apparatus a plurality of pairs of rotating rollers, means for rotating said rollers, means for moving a barrel on to said rollers, means for spraying the exterior of the barrel while positioned on said rollers with a washing fluid, a plurality of brushes adapted to engage the ends and periphery of the barrel as it rotates, means for supporting the end brushes including a parallel link motion for causing the brushes to remain in a horizontal position as they are moved toward and from the ends of the barrel, a swinging link for supporting each of said end brushes, means for supporting a peripheral brush including a pivotally mounted beam, means on said beam for supporting said swinging links, a cable connected to each end of said beams, a pulley over which said cable is adapted to pass, a weight on the free end of each of said cables for counter-balancing the beam and parts connected therewith, and means for moving said barrel off of said rotating rollers.

6. A barrel washing apparatus comprising a support for a barrel, means for rotating said support whereby the barrel will be rotated, means for supplying exteriorly a washing liquid to the barrel at each end and on the periphery, a brush engaging the periphery of said barrel, a brush engaging each end of the barrel, a beam arranged above said brushes, a link connecting the end brushes with said beam, a pair of cables connected with said beam, pulleys over which said cables pass, a pair of weights connected to said cables whereby the beam and parts connected therewith are yieldingly supported by said weights and associated parts, means connected with said end brushes for moving said end brushes toward and from the ends of said barrel, means for moving a barrel on to said support, and means for transferring the washed barrel from said support.

HENRY REININGER.